J. H. CARR.
CEMENT PIPE MACHINE.
APPLICATION FILED APR. 17, 1917.
1,292,250.
Patented Jan. 21, 1919.
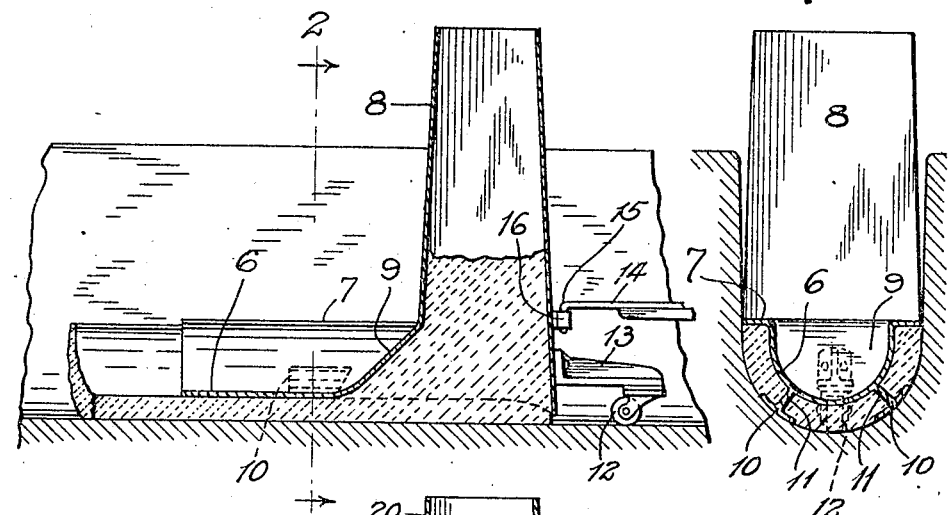
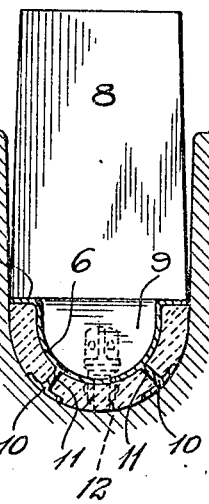
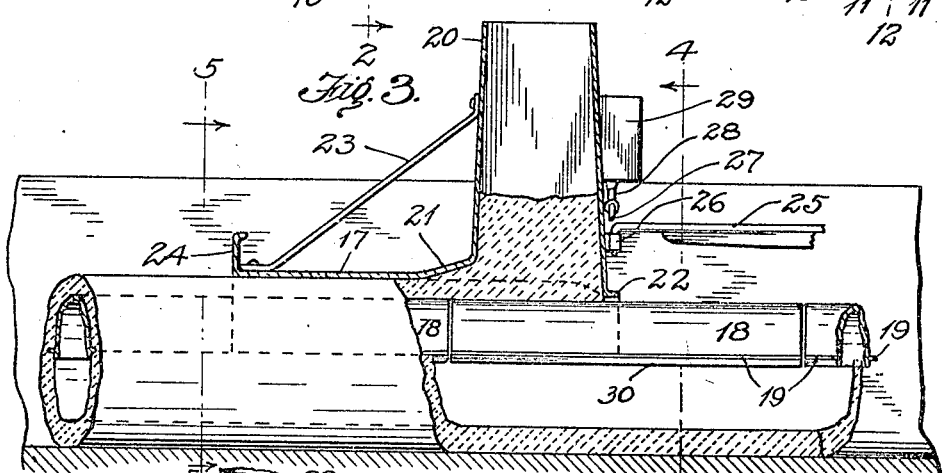
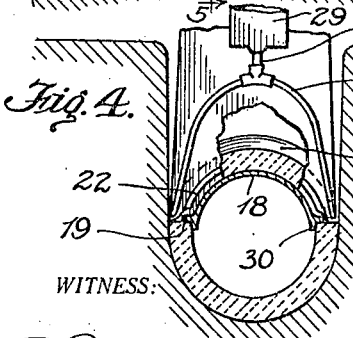
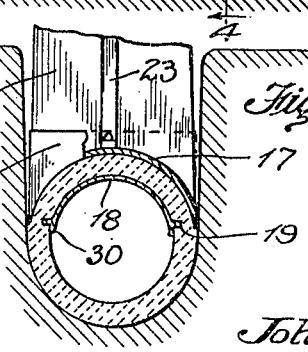
WITNESS:
F. Pollard
INVENTOR.
John H. Carr.
BY
Cassell Severance
ATTORNEY.

UNITED STATES PATENT OFFICE.

JOHN H. CARR, OF ALHAMBRA, CALIFORNIA.

CEMENT-PIPE MACHINE.

1,292,250.

Specification of Letters Patent.  Patented Jan. 21, 1919.

Application filed April 17, 1917. Serial No. 162,805.

*To all whom it may concern:*

Be it known that I, JOHN H. CARR, a citizen of the United States, residing at Alhambra, in the county of Los Angeles and State of California, have invented certain new and useful Improvements in Cement-Pipe Machines, of which the following is a specification.

This invention relates to improvements in apparatus for the making and laying of cement piping in ditches, excavations of any kind, or upon the ground.

It is an object of the invention to provide an apparatus having one portion adapted to form and lay one-half of a pipe, and with another portion of the apparatus adapted to follow over the part already laid and complete the upper portion of the pipe, whereby a fully constructed cement pipe and continuous duct is produced as the machine moves along.

It is also an object of the invention to provide an apparatus, one member of which is adapted to form a semi-circular cement concrete duct in an excavation or trench and over the same when sufficiently hardened to draw another portion of the apparatus along the upper edges of a portion of the pipe formed in the bottom of the trench or excavation, supporting arch members being first placed upon the portion of the pipe already laid, said arch members being of sufficient stiffness to hold a covering arch portion in plastic conditions, whereby a complete pipe is produced and it is laid in the ground.

It is a further object of the invention to provide an apparatus with molding portions adapted to shape the lower and upper portions of a pipe or duct, said shaping molding portions having hoppers for feeding the cement to the molding portions, while in a plastic or rather wet condition.

With these and other objects in view, the invention comprises certain novel constructions, combinations, and arrangements of parts, as will be hereinafter more fully described and claimed.

In the accompanying drawing, forming a part of this specification:

Figure 1 is a longitudinal sectional view through a portion of a trench and through the member of the apparatus which forms the lower portion of the pipe or duct.

Fig. 2 is a detail transverse sectional view taken upon the line 2—2 of Fig. 1.

Fig. 3 is a longitudinal vertical sectional view taken through a portion of the trench, and a portion of the apparatus which forms the upper part of the duct or pipe, the parts of the piping being in completed condition being also shown.

Fig. 4 is a transverse sectional view taken upon the line 4—4 of Fig. 3.

Fig. 5 is a transverse sectional view taken upon the line 5—5 of Fig. 3, part being broken away to show the shaping walls of the mold.

The apparatus forming the subject matter of this invention is designed to make it possible to lay concrete cement piping at the time that it is formed, that is to say, the piping is manufactured as it is laid when producing a continuous pipe or duct, without joints or breaks therein. I am aware that cement concrete piping has been continuously manufactured and laid at the same time, but with the present invention the piping is laid in two sections, an upper and a lower one, the lower half of the pipe is first formed in the bottom of the excavation, ditch, or other place where it is to be laid, and after it has sufficiently hardened, the upper half or portion is then formed or laid on top to complete the pipe or duct. In carrying out this process, one portion of the machinery used passes along in the ditch or other excavation, making and laying the lower portion of the pipe or duct. It is followed by the second part of the apparatus which builds the upper portion of the duct upon the lower portion, thus making a complete continuous pipe. In the accompanying drawing, one practical form of the apparatus has been illustrated, and the details and features of the invention will now be more specifically described, reference being had thereto. In the drawing 6 indicates a forming device or mold having a downwardly curved semi-cylindrical portion formed with out turned flanges 7 at its upper edges at a sufficient height to permit the formation of a little more than a half of the pipe. When the pipe is to be formed in an excavation or ditch, the mold or lower former 6 is placed in the bottom of the ditch, and is supported so as to leave room between the walls thereof and the walls of the ditch to form a portion of a pipe of sufficient thickness. The forward end of the former or mold is provided with an upper standing hopper 8, the walls of which are preferably flared outwardly to a slight extent from the top downwardly, so that cement or concrete mixtures placed in the said hopper can not become clogged or choked, the same will fall to the bottom in front of the former or mold 6 where it can be pressed into the shape desired. The lower part of the hopper is open, so as to permit the concrete to fall upon the ground and in front of the mold 6. The said mold is provided with an inclined forward wall 9, which facilitates the forcing of the cement or concrete beneath the walls of the former in such a way as to shape the mass into the lower portion of a pipe. The concrete mixture is fed into the upper open end of the hopper 8, rapidly enough to keep a column of the material therein standing at a height above the flanges 7 of the mold, so that the cement mixtures will always be forced to rise beneath the mold and the ledge forming flanges 7, under the pressure of the column of materials in said stand pipe. The lower edges of the hopper 8 extend sufficiently far into the ditch to prevent the concrete from escaping around the lower edge thereof to any appreciable extent. In order to properly space the mold 6 from the bottom of the excavation, runners or shoes 10 are preferably secured upon the semi-cylindrical portion of the former, having broad engaging base portions and narrow standards 11, which will pass through the cement easily as the device is pulled forwardly in the ditch. These shoes are preferably placed somewhat to one side of the center of the former as shown in Fig. 2, so that they tend to keep the former centrally located in the ditch. The cement concrete, which is usually quite wet when first placed in the ditch, readily divides as the shoes are drawn through it and closes together again behind them to complete an imperforate pipe formation before the material entirely passes away from it. The front end of the device is also spaced or supported with respect to the bottom of the ditch, either by a shoe similar to the shoes 10 just described, or by means of a roller or caster wheel 12, preferably secured upon the under side of a bracket or arm 13, which projects forwardly from the base of the hopper 8 as clearly shown in Fig. 1. The apparatus is thus kept at the proper height from the ground to permit the formation of the piping of the desired or required thickness. Any suitable draft means 14 may be connected with the said apparatus to facilitate its being pulled forwardly in the ditch or excavation as the piping is formed or laid, such draft means may consist in a tongue having a hook 15 on the end thereof, adapted to pivotally engage one or more brackets 16 on the hopper.

The lower portion of the pipe thus formed rapidly hardens and forms ledges upon the upper edges thereof, upon which the finishing apparatus may be moved in manufacturing and laying the upper portion of the pipe or duct. The finishing apparatus preferably consists of a mold 17 similar to the mold 6, but inverted with respect thereto, and made with a little larger radius, so that the said material will engage the outer surface of the pipe formed, instead of the interior surface thereof, as in the case of the mold 6.

In forming the upper portion of the pipe, an arch lining is provided which is adapted to rest upon the ledges formed by the lower portion of the pipe. Such arch lining, preferably consists of approximately semi-cylindrical pieces 18, having out turned flanges 19, adapted to rest upon the side ledges formed by the upper edges of the lower portion of the piping. Such lining pieces may be made of cheap material, such for instance, as paper of a suitable thickness to sustain the arch formation of the upper pipe, molded pulp, or thin sheet metal as preferred. The pieces 18 may be of any desired length and are laid in position upon the lower portion of the piping already formed, one after the other. It is preferable to make these lining pieces of as cheap material as possible, such as paper, molded pulp of any kind, cardboard or other like materials, for these arch linings are left in position after the top portion of the piping or duct is completed. Depending flanges or projections 30, on the pieces 18, prevent the arches from spreading under the weight of the concrete. The mold 17 is also connected with a hopper 20 at its forward edge, and an inclined portion 21 leads from the hopper into the mold 17, so as to crowd the concrete mixture beneath the mold in compact form. The forward wall of the hopper 20 has an opening at 22 sufficiently large to move over the tops of the arch pieces without disturbing them, but merely extending close enough thereto, to prevent any material escaping of the concrete mixture at the front or the sides of the hopper 20 and of the mold 17 extending downwardly as shown in Figs. 4 and 5, so as to rest upon the edges of the lower portion of the pipe. The mold 17 may be of comparatively thin metal, as well as the hopper 20, and the two may be braced with respect to each other by a brace rod 23. The mold may be further stiffened by an upwardly extending flange 24, which extends around the rear end of the mold as shown in Figs. 3 and 5. The apparatus may also be provided with a suitable draft means 25 hinged at 26 to the forward part of the hopper 20 and similar to the draft means 14 used with the hopper 8 and mold 6. The concrete cement mixture may be fed in the hopper 20 as rapidly as is desired, and should always be kept at a sufficient height therein to reach above the mold 17, so that the material will be crowded beneath the said mold with sufficient pressure to thoroughly form the upper section of the pipe. The upper mold or forming means of the apparatus may be drawn forwardly over the lower portion of the pipe steadily as the pipe is completed. As in forming the lower half portion of the pipe, the mixture is kept quite wet, so that it will properly flow to place within the mold 17, making a close knit impervious concrete structure or duct. Means is preferably provided for supplying a little cement water to the edge of the lower pipe portion already formed, just in advance of the upper molding apparatus, so that the upper portion of the pipe molded thereon, will be caused thoroughly to adhere to the harder cement below and make an integral joint therewith. Such means may consist of pipes 27 branching from a feed pipe 28, and extending downwardly toward the lower front edges of the hopper 20. A cement water receiving receptacle of any desired type may supply cement water to the piping 28 and 27.

It will be evident that a continuous concrete cement pipe may thus be progressively and continuously formed and laid at any desired place, and particularly in the ordinary ditches, excavated for piping. By making the cement mixture quite wet, it will not only flow beneath the forming device or molds with greater facility, but it will also make it possible to produce a concrete duct with walls which are substantially impervious to leakage or seeping. Of course, the pipe can be made of any desired thickness as to its walls.

What is claimed is:

1. A continuous pipe forming apparatus comprising a lower pipe forming mold adapted to be spaced a suitable height within an excavation, and having limiting edge portions at the top, a hopper for delivering cementitious material beneath the mold, an upper mold inverted with respect to the lower mold, and adapted to move upon the upper edges of the lower portion of the pipe already formed, lining elements forming an arch for the upper mold, and a hopper adapted to deliver cementitious material beneath said inverted mold to complete the upper portion of the pipe, and produce a finished duct.

2. A continuous pipe forming and laying machine comprising a lower approximately semi-cylindrical mold, having lateral flanges at the top, spacing shoes for keeping said mold at a proper distance from the ground, the said mold having an inclined forward edge for crowding the material beneath the mold, a hopper for delivering cementitious material to the mold in plastic condition, supporting means for the hopper coöperating with the shoes upon the mold, lining pieces adapted to support material above the lower portion of the pipe in a substantially arched formation, an upper mold adapted to slide upon the upper edges of the lower portion of the pipe form, and having an inclined portion for crowding cementitious material in plastic form beneath the same, whereby the upper portion of the pipe is completed over the arch forming pieces.

3. A continuous pipe forming and laying apparatus comprising a lower mold, spaced from the ground and adapted to shape approximately the lower half of a pipe, an upper mold adapted to be drawn upon the upper edges of the pipe already formed, lining pieces of thin material adapted to support the upper portion of the pipe as it is formed and until it hardens, and means for supplying liquid cement to the meeting portions of the parts of the pipe formed, whereby a continuous integral duct is produced.

In testimony whereof, I have hereunto set my hand, in presence of two witnesses.

JOHN H. CARR.

Witnesses:
CASSELL SEVERANCE,
EARLE R. POLLARD.

Copies of this patent may be obtained for five cents each, by addressing the "Commissioner of Patents, Washington, D. C."